(12) United States Patent
Mizutani et al.

(10) Patent No.: US 6,907,257 B1
(45) Date of Patent: Jun. 14, 2005

(54) METHOD AND APPARATUS FOR SEARCHING FOR RADIO STATION FOR WIRELESS AD HOC COMMUNICATION NETWORK

(75) Inventors: Akihiko Mizutani, Zhushi (JP); Susumu Shimotono, Hadano (JP); Toru Aihara, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/706,660

(22) Filed: Nov. 6, 2000

(30) Foreign Application Priority Data

Nov. 10, 1999 (JP) .......................................... 11-319261

(51) Int. Cl.[7] ................................................. H04B 1/38
(52) U.S. Cl. .................... 455/464; 455/452.1; 370/339; 370/335
(58) Field of Search ........................ 455/446, 69, 452.1, 455/422.1, 507, 524, 517, 412, 411; 370/389, 335, 344, 445, 400, 330; 375/131

(56) References Cited

U.S. PATENT DOCUMENTS

| | | | | |
|---|---|---|---|---|
| 5,551,066 A | * | 8/1996 | Stillman et al. ............... 455/69 |
| 5,745,483 A | * | 4/1998 | Nakagawa et al. ......... 370/335 |
| 6,026,303 A | * | 2/2000 | Minamisawa ................ 455/446 |
| 6,104,712 A | * | 8/2000 | Robert et al. ................ 370/389 |
| 6,445,917 B1 | * | 9/2002 | Bark et al. ................... 455/423 |
| 6,493,550 B1 | * | 12/2002 | Raith ....................... 455/244.1 |
| 6,519,460 B1 | * | 2/2003 | Haartsen ................... 455/452.1 |
| 6,600,933 B1 | * | 7/2003 | Hiramatsu et al. .......... 455/561 |

* cited by examiner

*Primary Examiner*—Nick Corsaro
*Assistant Examiner*—Edan Orgad
(74) *Attorney, Agent, or Firm*—Casey August; Anne V. Dougherty

(57) ABSTRACT

A system and method wherein a master node 710 comprises, as its primary components, a protocol stack 715, a transceiver 720, a search scheduler 725, communication volume prediction means 730 and outside-channel, signal induced interference intensity measuring means 735. A slave node 750 comprises, as its primary components, a protocol stack 760, a transceiver 765 and a search routine 755. The signal induced interference intensity read by the signal induced interference intensity measuring means 735 is transmitted to the search scheduler 725. The search scheduler 725 then employs the signal induced interference intensity to determine the total amount of the resources that are to be allocated for a search.

19 Claims, 11 Drawing Sheets

Determination of radio station search times for entire cluster

Network components

Ad hoc network configuration

Case where a new node is acquired

Case where two networks are approaching

Signal induced
interference intensity
(new node is acquired)

Signal induced
interference intensity
(multiple networks are approaching)

Arrangement of network node

Operation of search scheduler

Determination of radio station search times for entire cluster $error_k$ : Error rate for slave.
$data_k$ : Predicted data rate of slave.
$a_k/S$ : Search allocation ratio for slave.
$T_{IQ}$ : Search time for entire cluster during one period
$T_{IQ:k}$ : Search time for slave during one period Allocation of search time for each slave Determination of search order for slaves

METHOD AND APPARATUS FOR SEARCHING FOR RADIO STATION FOR WIRELESS AD HOC COMMUNICATION NETWORK

FIELD OF THE INVENTION

The present invention relates to a method and an apparatus for efficiently searching for a peripheral radio station in a network, especially in a wireless ad hoc communication network.

BACKGROUND OF THE INVENTION

As presently planned, in the year 2000 Bluetooth, which is a wireless data communication technique, will be set up as a new short-distance wireless communication system for PCs (personal computers) or peripheral devices. Specifications for Bluetooth can be obtained from, for example, http://www.bluetooth.com/.

Since it is easy to distribute Bluetooth, Bluetooth is considered suitable for use as the physical layer for an ad hoc network. An ad hoc network is one that is freely constructed without a fixed facility being required.

The primary reason for using Bluetooth is to provide a replacement for cables between PCs and peripheral devices. Providing connections between specific devices is also regarded as important. Therefore, the structure of Bluetooth is not always appropriate for the construction of an ad hoc network.

A component of Bluetooth, as is shown in FIG. 1, is a small communication unit called a piconet 100, which comprises a single master radio station (node), 110, and up to seven slave radio stations (nodes), 120, 130, 140, 150, 160 and 170.

Each piconet 100 uses its own hopping sequence to perform frequency hopping, and can not directly communicate with other such communication units.

Therefore, for communication among nine or more radio stations to interconnect piconets, a multi-hop communication form which uses a bridge must be employed, regardless of physical distances involved.

Frequency hopping is a frequency diffusion communication system whereby an oscillating frequency is frequently changed by using a pseudo-random number. The hopping sequence itself is a pseudo-random number that defines the order in which the frequency is changed.

A bridge (or a gateway) is a node that is shared by a plurality of different piconets and that can communicate with all the piconets among which it is shared.

For multi-hop communication, when a sender can not directly communicate with a specific recipient, to enable communication an intermediate node is used to relay packets. When Bluetooth is employed to constitute an ad hoc network encompassing an unspecified number of radio stations, a cluster configuration 200, such as is shown in FIG. 2, is common because of the form of the above described physical layer.

In a cluster network 200, each cluster, 210, 220, 230, 240 or 250, comprises several radio stations (nodes) in a communication area, with one radio station (node), 212, 222, 232, 242 or 252, that is called a cluster head (or a master) at the center.

While the same channel is employed for communication within an individual cluster, a different channel is employed for communication among clusters.

A channel is a logical communication path that is employed by using the same communication procedures (including the hopping sequence) to enable bi-directional communication.

When there is a radio station (e.g., 262 or 264) that can receive signals from two adjacent clusters, this radio station (node) serves as a communication bridge, and reciprocates along the channel between nodes.

The cluster network 200 is constituted by the set of clusters that are connected by the bridges 262, 264, 266, 268, 270 and 272.

According to Bluetooth, a piconet corresponds to a cluster, and a master piconet corresponds to a cluster head. Generally, information concerning nodes that are present in a communication area is not provided for an ad hoc network in advance.

That is, when an ad hoc network is constructed, information concerning nodes that are present in a communication area must be obtained, because such information is not made available to the network in advance.

Further, as time elapses the conditions in a surrounding communication area may be changed by the movement of nodes or clusters; new nodes or other clusters may approach and enter the communication area, or nodes or clusters that are currently communicating members may move outside the area.

In order to maintain or manage a network under such conditions, periodical searches for and monitoring of neighboring nodes is required, and a part of the consumable resources (communication time, electric power, etc.) that are available for processing normal communications must be allocated for these search and monitoring activities.

Therefore, when the frequency at which neighbor node monitoring or search activities are performed is high, the overhead for these operations is increased and can contribute to a substantial reduction in the data rate (the data transfer speed). But when the frequency at which neighbor node monitoring or search activities is low, the locating of new nodes or clusters is delayed, and dynamic network changes can not be promptly coped with.

Under normal network employment conditions, during which node movements do not occur very frequently, in many cases the performance of monitoring or search activities constitutes a non-productive, futile expenditure of time and resources.

Since with Bluetooth at least 10 seconds is required to conduct a single search for neighboring nodes, the above trend is especially marked.

To construct a new network, in consonance with the scale, one to several minutes are required for a search for neighbor nodes, and even after the network is constructed, an extremely large overhead is incurred.

Therefore, if there is no network connection format or a mechanism that provides for the performance of searches and monitoring only when the probability of a topological change is high, and that reduces the frequency at which monitoring or search activities are normally performed, it is difficult to operate an ad hoc network using Bluetooth.

For a network that employs a system other than Bluetooth, the overhead incurred by performing searches for neighboring nodes can also be greatly reduced, and topological changes can be quickly coped with.

Wireless ad hoc communication has been studied since the 1970's as a communication means for use in locations whereat no backbone infrastructure are present, or as an application for portable devices.

An example of a typical ad hoc wireless communication study is reference [1], "Protocols For Adaptive Wireless And Mobile Networking," D. B. Johnson and D. A. Maltz, IEEE Personal Communications, Vol 3, No. 1, 1996, pp. 34–42. Ad hoc wireless communication has also been continuously studied by the IETF (Internet Engineering Task Force), the association that is responsible for the design and development of the protocol and the architecture for the Internet (e.g., reference [2], "The Zone Routing Protocol (ZRP) For Ad Hoc Networks," Z. J. Haas and M. R. Pearlman, draft-ietf-manet-zone-zrp-02.txt, 1999, and reference [31], "Ad Hoc On-Demand Distance Vector (AODV) Routing," C. E. Perkins, E. M. Royer and S. R. Das, draft-ietf-manet-aodv-03.txt, 1999).

For communication for which the cluster structure is employed, see reference [4], "Multicluster, Mobile, Multimedia Radio Network," M. Gerla and J. T. *C. Tsai, J. Wireless Networks, Vol. 1, No. 3, 1995, pp. 255 to 265, and reference [5], "Cluster Based Routing Protocol (CBRP) Functional Specification, " M. Jiang, J. Li and Y. C. Tay, draft-ietf-manet-cbrp-spec-00.txt, 1998.

In the above references, [1]to [5], it is assumed that a nearby radio station can be discovered comparatively easily, and substantially, no method for reducing the overhead involved in performing a search is taken into consideration.

For a proximity type wireless system such as Bluetooth, the use of which is expected to spread after the year 2000, a problem arises in that very much labor is required to locate a peripheral radio station because ad hoc communication is not regarded as important (reference [6], Bluetooth Specification Version 1.0A, 1999).

It is, therefore, one object of the present invention to reduce the time required to perform a search for a connectable radio station, so that new wireless ad hoc communication networks can be constructed or so that established networks can be re-constructed in consonance with the movement of a radio station.

It is another object of the present invention to provide a method whereby cluster-based wireless ad hoc communication networks can monitor the quality of received signals and can distribute the signals so as to efficiently search for peripheral radio stations.

SUMMARY OF THE INVENTION

According to the present invention, an increase in jamming waves (by which received signals are deteriorated) is regarded as a sign that precedes the appearance of an unknown radio station, and is employed as a trigger for a radio station search process. As a result, there is a reduction in the consumption of allocated resources, such as communication time and electric power, that in the normal state are expended on meaningless network searches. Since the load imposed by the performance of a search for a radio station is distributed among a plurality of nodes, the overhead for the ad hoc communication network as a whole is reduced, and the average search time is shortened.

BRIEF DESCRIPTION OF THE DRAWINGS

The invention will now be described with specific reference to the appended drawings wherein.

DETAILED DESCRIPTION OF THE INVENTION

There are at least two cases wherein new connections are made to an ad hoc communication network. One is where a new node is acquired by a conventional network area (FIG. 3), and the other is when a plurality of separate networks approach a communication enabling zone (FIG. 4).

Figure 3:
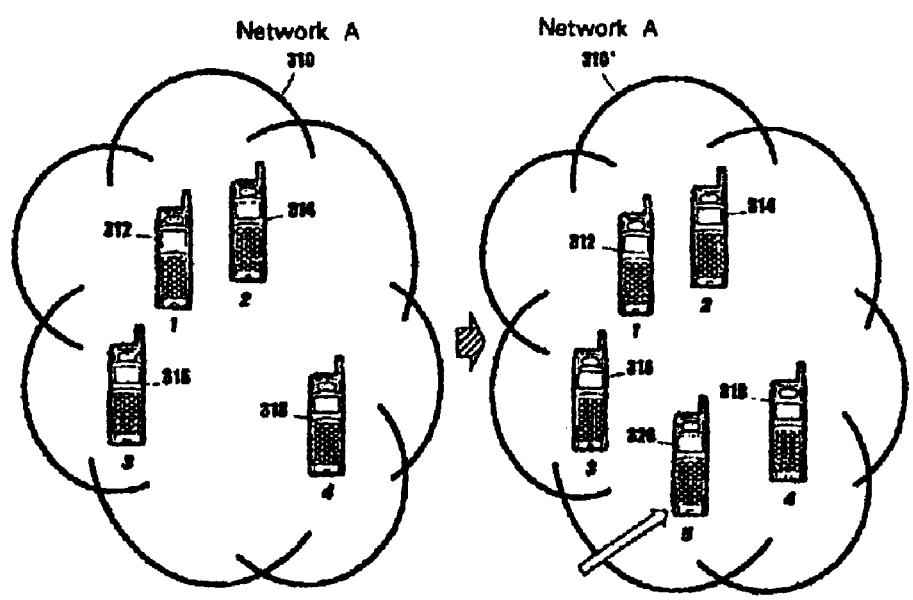
FIG. 3 is a diagram showing an example wherein a new connection is provided for the ad hoc communication network (a new node is acquired).
Figure 4:
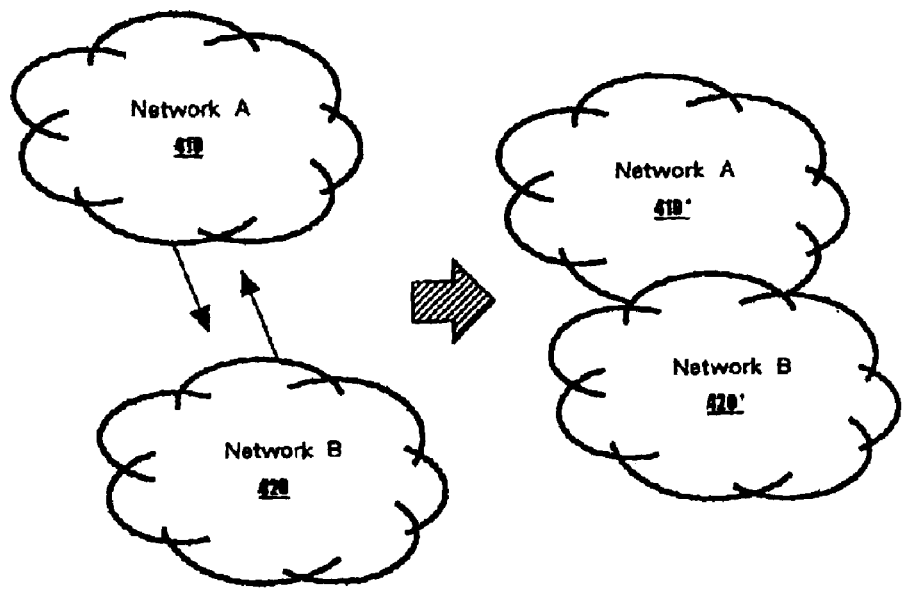
FIG. 4 is a diagram showing an example wherein a new connection is provided for the ad hoc communication network (two separate networks approach a cluster).

Initially, in FIG. 3, four nodes, i.e., node 1 (312), node 2 (314), node 3 (316) and node 4 (3.18), constitute a network A (310).

When a new node 5 (320) plans to join the network A (310') (FIG. 3), this node transmits a radio signal to notify the other nodes of its presence in their vicinity. The network A (310'), however, regards this radio signal simply as interference propagated by a source outside a logical channel.

Further, when networks A (410) and B (420) are moving so that they are separately approaching a communication enabling zone (FIG. 4), a signal transmitted by the network A (410') is regarded as an interference signal by the network B (420'), and conversely, a signal transmitted by the network B (420') is regarded as an interference signal by the network A (410').

Figure 5:
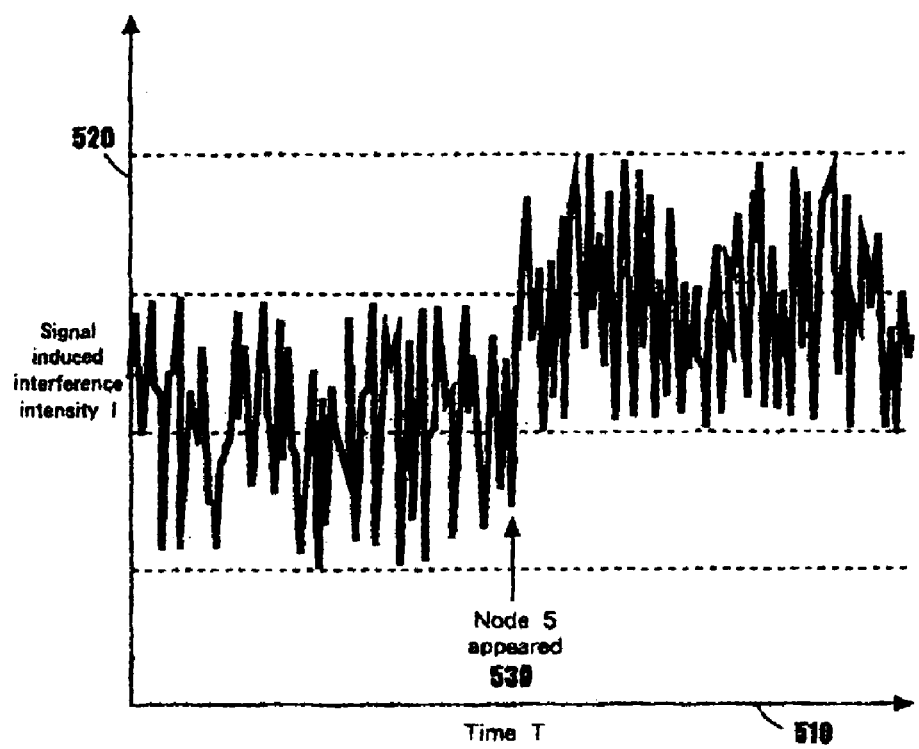
FIG. 5 is a graph showing a change in the an interference intensity along the time axis when a new connection is provided for the ad hoc communication network (a new node is acquired).

FIG. 5 is a graph prepared for the case in FIG. 3 (where a new node is joining a network) showing the relative intensity, along the time axis for a node, of the signal induced interference. In FIG. 5, a horizontal axis 510 represents the elapsed time, and a vertical axis 520 represents the intensity I of the signal induced interference. In FIG. 5, it is readily apparent that at a midpoint 530 a new node 5 appears and the intensity I of the signal induced interference is increased.

Figure 6:
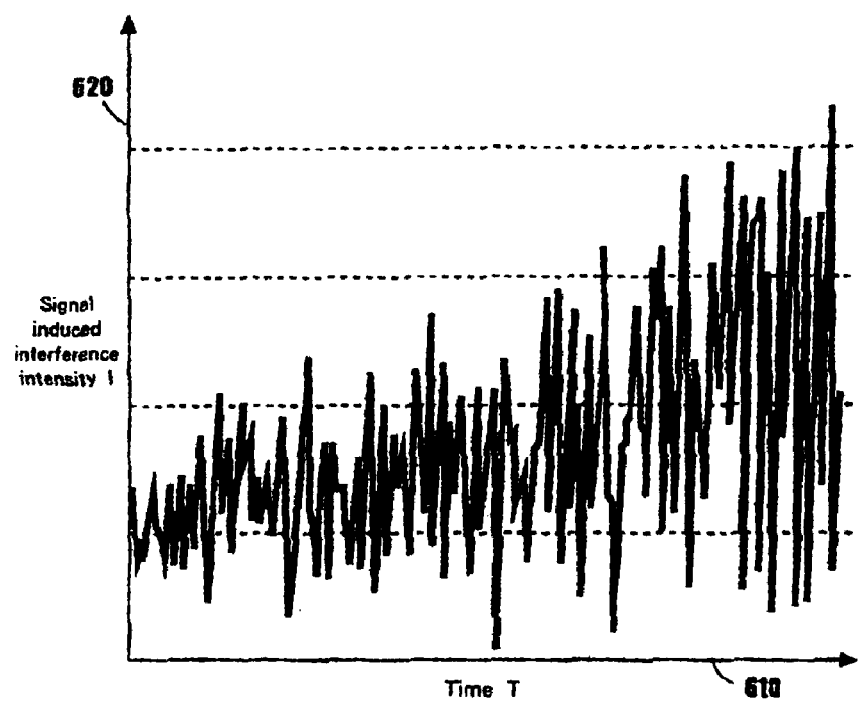
FIG. 6 is a graph showing a change in the interference intensity along the time axis when a new connection is provided for the ad hoc communication network (two separate networks approach a cluster).

FIG. 6 is a graph prepared for the case in FIG. 4 (where a plurality of moving networks are approaching a communication enabling zone) showing the relative intensity, along the time axis for a node, of the signal induced interference.

In FIG. 6, a horizontal axis 610 represents the elapsed time, and a vertical axis 620 represents the intensity I of the signal induced interference. In FIG. 6, it is readily apparent that as time elapses, and the two networks near the communication enabling zone, the intensity I of the signal induced interference gradually increases (increases to the right).

As is evident in either case shown in FIGS. 5 and 6, as time elapses the intensity I of the signal induced interference increases (to the right in FIGS. 5 and 6).

According to the present invention, the intensity of the signal induced interference is employed as an index for a topological change, and is used to control the resources that are to be allocated for a search for a radio station. Since the signal induced interference intensity is employed as an index for a topological change, there is a reduction in the resources allocated for meaningless searches performed when there are no subsequent topological changes, and there is a further reduction in the overhead, for a radio station, imposed by the performance of a search. Further, when a topological change does occur, a concentrated search is performed and a network is quickly constructed.

(1) When the intensity of all the signal induced interference originating outside a logical channel is monitored in an ad hoc communication network, and when there is a significant increase in the intensity, the frequency at which searches for or the monitoring of radio stations is increased. In all other cases, the frequency is reduced.

When the measurement of the intensity of all the signal induced interference is difficult because of restrictions imposed on the physical layer, the deterioration of communication quality that is due to interference may be used as an index for a topological change.

The deterioration that in this instance is specifically detected is a reduction in the CIR (Carrier to Interference power Ratio), which is a measurement that is common to all communication systems.

In a case where there is direct diffusion, or in a case where fast frequency hopping occurs two or more times for one symbol, a correlating reduction between a received signal and a diffusion sign can be employed as the above described index.

For a slow frequency hopping system or a time-sharing multiplexing system, a rise in the error rate can be used as the index.

Further, for a network wherein polling is employed for communication activities performed within the same cluster and whereby a CSMA/CA (Carrier Sense Multiple Access/Collision Avoidance) system is used to prevent packet collisions in different clusters, back-off time is increased, and all these factors can be employed as the index. The factors that can be used for the index, however, are not limited to those described above.

(2) When an ad hoc communication network is constructed, especially of clusters, a cluster head performs the scheduling for searches to be conducted by all the cluster so that the loads imposed on the nodes in the cluster are uniform, and to minimize the effect on data communication.

The cluster head monitors the communication volume for each node, and distributes, to the nodes, a search time that is determined by (1), based on a predicted value for the communication volume in the near future. The nodes then perform a search, beginning with a node that has no data to be transmitted.

Since the work performed by a cluster head and a bridge greatly affect the performance of an entire network, basically, they do not perform searches.

Primarily, the cluster head periodically monitors search packets in order to obtain information concerning searches performed by other clusters or other nodes.

Figure 1:
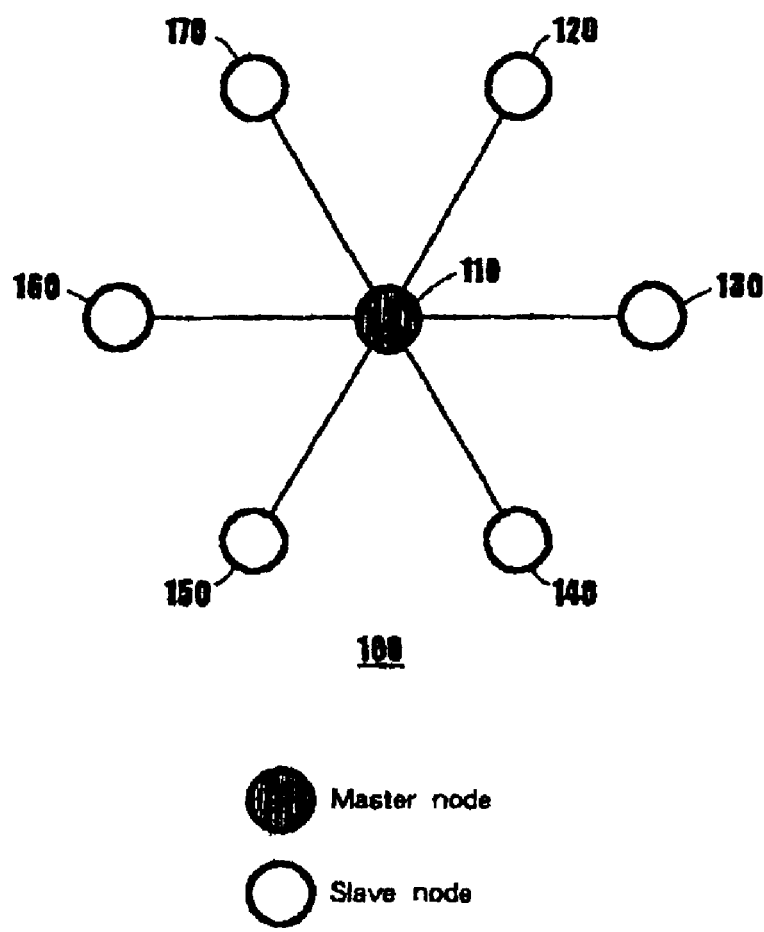
FIG. 1 is a diagram showing the components of a network for which the present invention can be applied.
Figure 2:
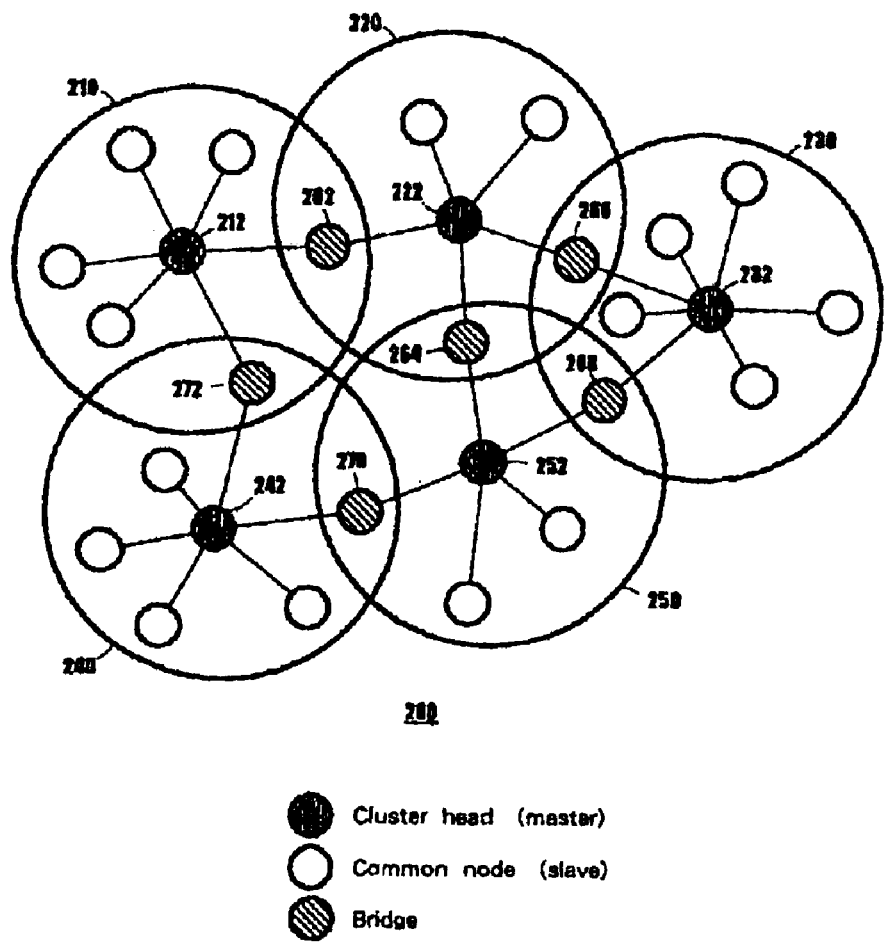
FIG. 2 is a diagram showing an example arrangement of an ad hoc communication network for which the present invention can be applied.

To simplify the following explanation, it will be assumed hereinafter that the cluster form is used for all networks, and that each network includes a master cluster and slave clusters, as shown in FIG. 2. It will also be assumed that new nodes, which are to join networks, or network slave nodes transmit packets to perform searches, and that the master nodes only occasionally monitor the search packets.

Figure 7:
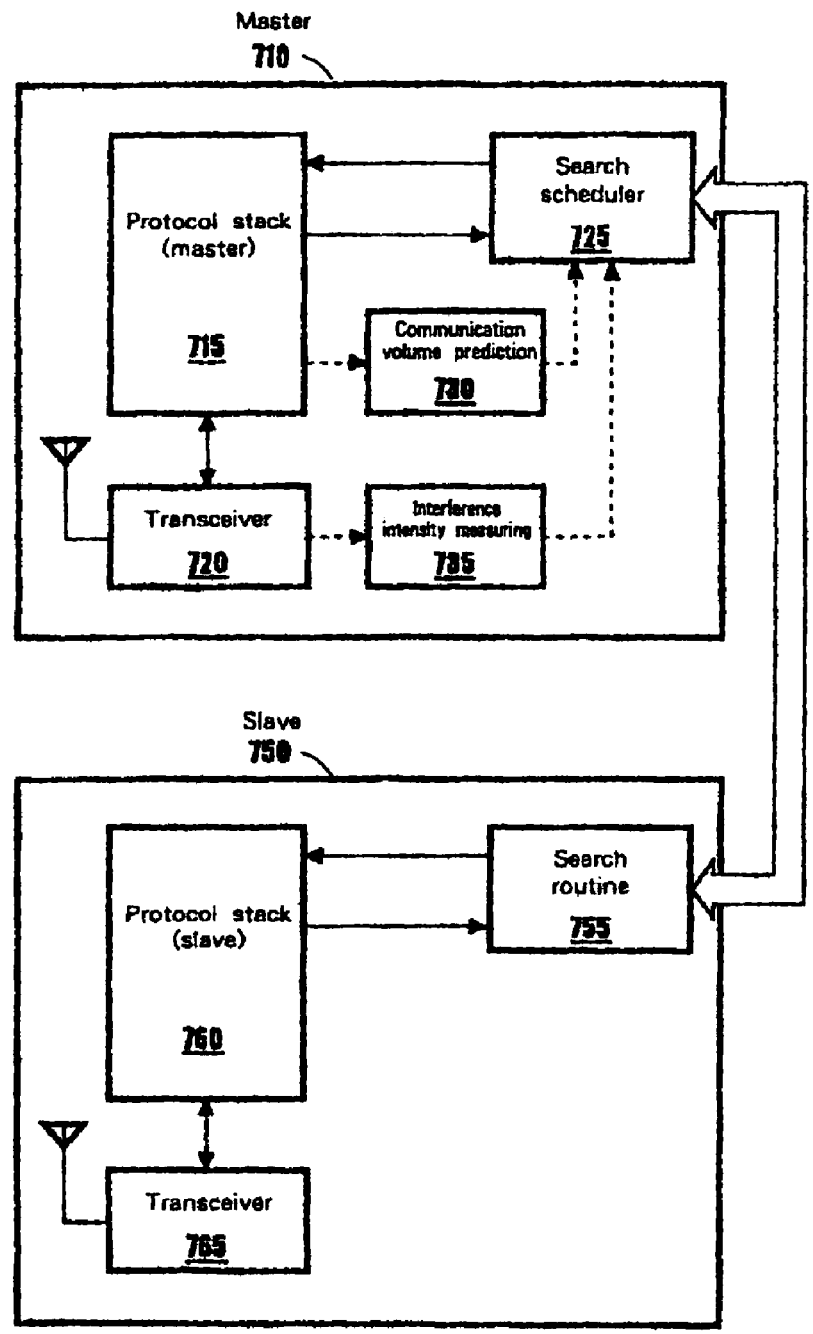
FIG. 7 is a block diagram showing an appropriate network arrangement for the present invention.

A master node and a slave node in a network are arranged as is shown in FIG. 7. A master node 710 comprises, as its primary components, a protocol stack 715, a transceiver 720, a search scheduler 725, communication volume prediction means 730, and an outside-channel, signal induced interference intensity measurement means 735. A slave node 750 comprises, as its primary components, a protocol stack 760, a transceiver 765 and a search routine 755.

In FIG. 7, the transceivers 720 and 765 correspond to the physical layer for communication, and the protocol stacks 715 and 760 correspond to an upper covering layer extending from a data link layer up to an application layer. The search scheduler 725 and the search routine 755 control the distribution of search resources and the execution of searches for the entire cluster. The search scheduler 725 and the search routine 755 are a part of the network layer of the protocol stacks 715 and 760, and are illustrated and explained separately.

The signal induced interference intensity measuring means 735 employs the transceiver 720 to measure the intensity of signal induced interference originating outside a local channel. When the intensity of signal induced interference can not be measured because of restrictions imposed on a device, the error rate obtained by the data link layer may be used instead.

The communication volume prediction means 730 monitors the flow of data in the protocol stack 715, and prepares predictions concerning the volume of the communications that will be performed by the slaves in the future.

Figure 8:
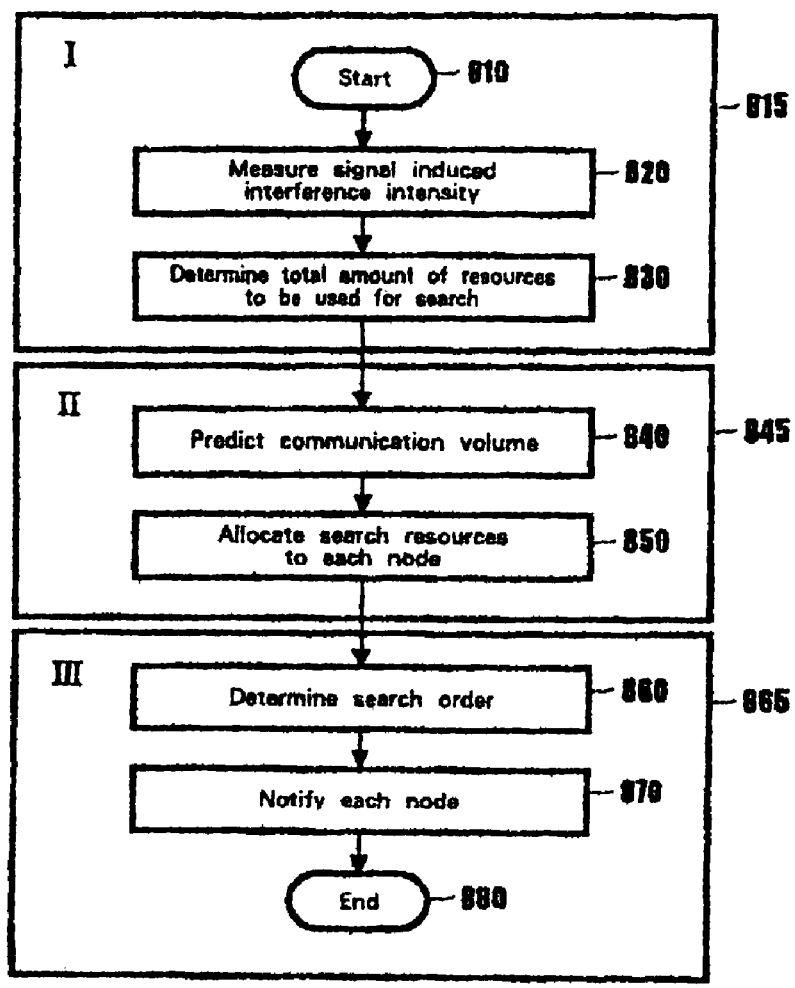
FIG. 8 is a flowchart showing the operation performed by a search scheduler according to the present invention.

FIG. 8 is a flowchart showing the processing that is mainly related to the search scheduler 725. The intensity of the signal induced interference measured by the signal induced interference intensity measuring means 735 is transmitted to the search scheduler 725 (step 820).

The search scheduler 725 employs the obtained intensity of the signal induced interference to determine the total quantity of the resources that are to be allocated for a search (step 830). That is, when a significant increase in the intensity of the signal induced interference occurs, the resources allocated for searches are increased. And when the intensity is reduced, or after a new cluster has been found by a previous search, the resources allocated for searches are reduced. At the same time, the frequency the master node uses to monitor search packets is adjusted.

In accordance with the volume of the communications predicted by the communication volume prediction means 730 (step 840), the search scheduler 725 allocates, to each node, a time to perform a cluster search (step 850).

At step 850, a shorter search time is allocated for a node having a greater predicted communication volume, while a longer search time is allocated for a node having a smaller predicted communication volume.

Further, the search scheduler 725 determines the search order in accordance with the existing communication state, and prepares a schedule for all the nodes in the cluster to prevent overlapping searches (step 860).

Thereafter, the schedule prepared at step 860 is formed into a packet that is transmitted, via the protocol stack 715 and the transceiver 720 of the master node and via the transceiver 765 and the protocol stack 760 of the slave nodes, to the search routine 755 in the slave node 750. The slave node 750 initiates a search in accordance with the schedule received by the search routine 755. When another node is found, the search routine 755 immediately notifies the master node.

Figure 9:
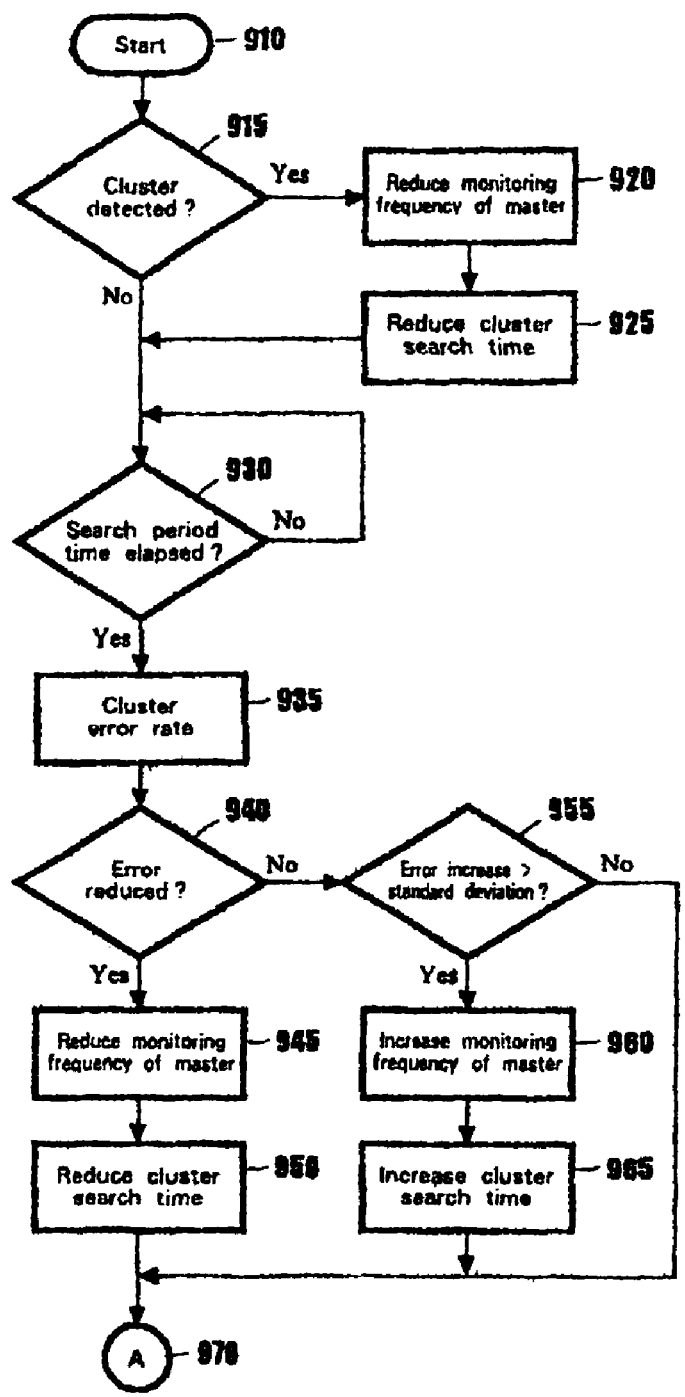
FIG. 9 is a flowchart showing the processing performed to determine the time at which the entire cluster will search for a radio station when the present invention is employed.
Figure 10:
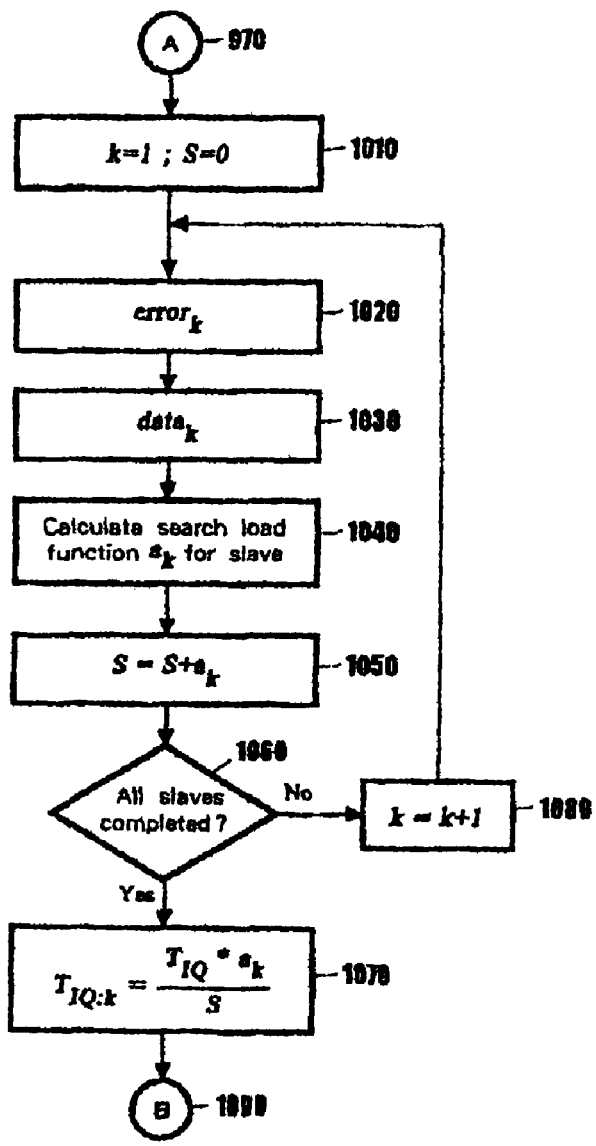
FIG. 10 is a flowchart showing the processing for the allocation of search times to individual slave nodes when the present invention is employed.
Figure 11:
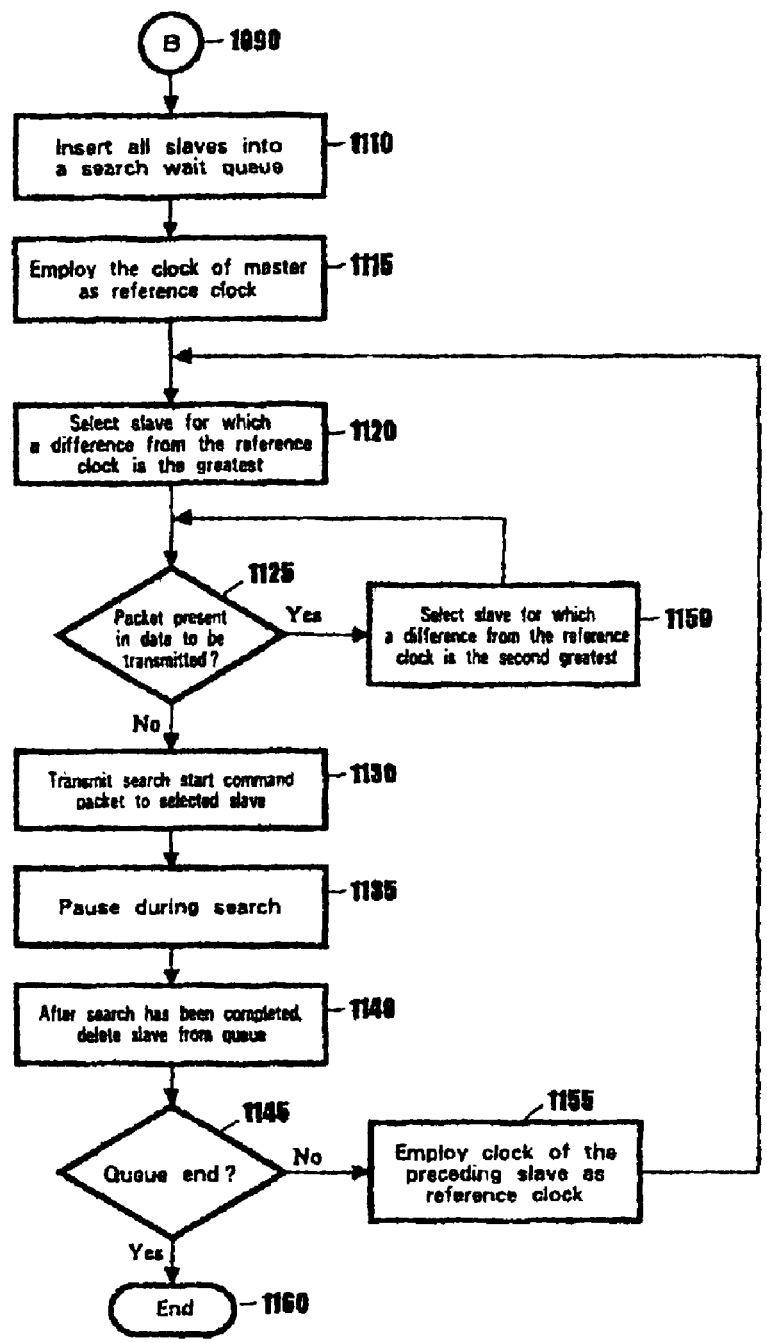
FIG. 11 is a flowchart showing the processing performed to determine the search order for the individual slave nodes when the present invention is employed.

FIGS. 9 to 11 are flowcharts showing the processing performed to set up a scheduler for Bluetooth. Since according to Bluetooth a transceiver does not include a mechanism for directly measuring interference originating outside a logical channel, instead of intensity a packet error rate is employed as an index.

FIG. 9 is a detailed flowchart showing the process (a portion 815 in FIG. 8) by which an error rate is employed to determine the total amount of search resources available in a cluster. FIG. 10 is a detailed flowchart showing the process (a portion 845 in FIG. 8) by which the predicted volume of communications is used to allocate a search load for each node. And FIG. 11 is a detailed flowchart showing the process (a portion 865 in FIG. 8) by which a search schedule is prepared for a cluster.

In this example, it is assumed that the search time to be allocated for an entire cluster is determined during a constant search cycle (one to several minutes). When an error rate increases, it is assumed that the probability is high that a new node or a new cluster will appear nearby, and the time allocated for a search by a slave node is increased.

At the same time, the interval whereat the master node monitors search packets is reduced so as to shorten the response time for a search for another cluster or a new node. At step 915 in FIG. 9, a check is performed to determine whether another cluster was found during the preceding cycle. When another cluster was found, program control advances to step 920, and when no cluster was found, program-control shifts to step 930.

At step 920, the monitoring frequency for the master node is reduced, as is the time required by the master node to perform a search and to monitor a search packet.

At step 925, the time allocated for searches performed by the cluster is reduced, as is the time required by the cluster to perform a search and to monitor 4 search packet.

At steps 920 and 925, the cause of the increase in the error rate has already been found and a different cluster is now continuing to serve as an interference source. Thus, if there is no further change in the, error rate, the probability of finding a new node or cluster is low, and the search time can be reduced.

At step 930, a check is performed to determine whether a time allocated for a search period has elapsed since the preceding search. When the time allocated for the search period has elapsed, program control advances to step 935.

But when the allocated time has not elapsed, program control enters a loop and waits for the search period time to elapse.

At step 935, the error rate for the cluster is measured. At step 940, the error rate obtained for the entire cluster is compared with the average error rate timing. When the error rate for the entire cluster is equal to or greater than the average time value, program control shifts to step 955. And when the error rate is smaller than the average time value, program control advances to step 945. At step 945, the frequency for the monitoring performed by the master node is reduced.

At step 950, the search time for the cluster is reduced. At step 955, a check is performed to determine whether a difference between the measured error rate obtained for the entire cluster and the average time value exceeds a standard deviation. When the difference exceeds the standard deviation, program control advances to step 960. When the difference does not exceed the standard deviation, program control shifts to a coupler A (970).

At step 960, the frequency for the monitoring performed by the master node is increased. At step 965, the search time for the cluster is increased.

Through this processing, when the measured error rate for the cluster exceeds the standard deviation and is greater than the average time value, it is assumed that a significant change has occurred in the error rate and the resources allocated for searches and for monitoring are increased.

When a cluster is approaching, both the master node and the cluster node perform the same process, so that the quick establishment of a bridge can be expected. When the measured error rate for the entire cluster is equal to or lower than the average time value, the probability of the appearance of a new node or cell is low, and the resources allocated for the searches are reduced. But when it is discovered that the error rate is slightly elevated, the same search as is described above is performed.

In FIG. 10 is shown an overview of the process by which the search time that is obtained in FIG. 9 for an entire cluster is allocated to the individual nodes that form the cluster.

Since a search performed by the master node or by using a bridge increases the load imposed on a network as a whole, in principle the search time is allotted only for slave nodes other than a bridge.

Further, in order to minimize the effect on normal communications, a shorter search time is allocated for a slave having a large data communication volume, and a longer search time is allocated for a slave having a small data communication volume.

When the error rate differs from slave to slave, it is assumed the probability is good that a new node or cluster has appeared near a slave having a high error rate, and the search ratio is increased.

While a search load function is calculated in FIG. 10, an appropriate function, such as an error rate increase m function or a data volume reduction function, may be selected as a function to be performed.

An example search load function is obtained by using the following equation.

$$a_k = (A + \text{error}_k)/B + \text{data}_k)$$

(A and B are positive constants)

The function for ak need not always be employed, and the load may be uniformly allocated to all the slaves.

At step 1010, 1 and 0 are input to respectively initialize k and S. At this time, k denotes a k-th slave node, and S denotes the sum of the search load functions for all the slave nodes. At step 1020, an error rate value $\text{error}_k$, is extracted for the k-th slave node. At step 1030, a predicted data rate value $\text{data}_k$ is extracted for the k-th slave node. At step 1040, the search load function ak is calculated for the k-th slave node. At step 1050, S=S+ak is calculated. At step 1060, a check is performed to determine whether the sum S of the search times has been calculated for all the slave nodes. When the calculation of the sum S has been completed for all the slave nodes, program control advances to step 1070. But when the calculation of S has not yet been completed, program control is shifted to step 1080 and from there enters a loop.

At step 1080, k is incremented by one (k=k+1), and program control returns to step 1020. At step 1070, $T_{IQ:k}$ is obtained by using $T_{IQ}$, ak and S, and program control advances to a coupler B (1090). It should be noted that $T_{IQ}$ is the search time obtained in FIG. 9 for the whole cluster.

$$T_{IQ:k} = (T_{IQ} * ak)/S$$

FIG. 11 is a flowchart showing the process by which the search times that were obtained in FIG. 10 for the individual slave nodes are used to determine the search order for the slave nodes.

First, an appropriate search order is determined in accordance with the physical layer. The order is changed for a node holding data to be transmitted, and the node is permitted to perform the search later, so that the effect on communication is minimized.

For the following reasons, differences between clocks are employed to determine the search order in FIG. 11. According to Bluetooth, a node that performs a search sequentially transmits its own ID to neighbor nodes during a dedicated search hop sequence, and when the neighbor nodes respond to this transmission, the search is established.

The search hop sequence is divided into two frequency groups (or trains), A and B. The search node always employs train A to initiate transmission of its ID, and then employs train B after the transmission by train A has continued for a specific time. The frequency included in each train differs depending on the node, and is determined in accordance with the self-operated clock. It is recommended that the object of a search monitor the center frequency of its train A intermittently, once every 2.56 seconds, and for 11.25 mS.

If the recommended values are employed, but the ID is not continuously transmitted along the same train for at least 2.56 seconds, none of the nodes that are currently being monitored can receive the ID.

When between two nodes there is a large difference in clocks, the monitoring frequency is included in the train B of the search node. Therefore, it is difficult to find a new node during the search while using the train A, and a doubled transmission time (at least 5.12 seconds) is required.

In addition, since a back-off occurs to prevent a packet collision, it is specified that even in an error free condition, at least ten seconds is required to examine all neighbor nodes during a single search.

If the search time is shortened in order to reduce such a load, the probability of finding a new node during one search differs greatly for the trains A and B.

Especially when a search is performed for 2.56 seconds or less, a node belonging to the train B can not be found, so that at least 3.2 seconds is required for the search.

When a plurality of nodes in a cluster cooperate in the performance of a search, their clocks differ, so that each train A is composed of a combination of different frequencies.

Therefore, when a node is selected for which the clock difference with the node that performed the immediately preceding search is the greatest, many search frequencies can be scanned during a short period of time.

Especially when the sum of the trains A of all the slave nodes includes all the search frequencies, all the nodes can be found during a single search that is shorter than 2.56 seconds. In this case, instead of reducing the search time, the times for the searches can be increased to reduce the load imposed on the network, without changing the probability that a radio station will be found.

At step 1110, all the slave nodes are entered in a search wait queue. At step 1115, the clock of the master node is regarded as a reference clock. At step 1120, a slave node for which the difference from the reference clock is the greatest is selected from the search wait queue. At step 1125, a check is performed to determine whether a data packet to be transmitted to a selected slave node is present. When the packet is not present, program control advances to step 1130. When the packet is present, program control is shifted to step 1150. At step 1150, a slave node for which the difference from the reference clock is the second greatest is selected. Program control thereafter returns to step 1125. At step 1130, a search start command packet is transmitted to the selected slave node. At step 1135, the process is paused while the search is performed. At step 1140, after the search has been completed, the pertinent slave is deleted from the search wait queue. At step 1145, a check is performed to determine whether the search wait queue is empty. When the queue is empty, the processing is terminated (1160). But when the queue is not empty, program control advances to step 1155. At step 1155, the clock of the slave node that performed the immediately preceding search is employed as the reference clock. Program control thereafter returns to step 1120.

With the arrangement used for this invention, the time required to search for a connectable radio station can be reduced before a new wireless ad hoc communication network is constructed, or before such a network is re-constructed following the relocation of a radio station.

With the arrangement used for the invention, it is possible to provide a method whereby a cluster-based wireless ad hoc communication network can monitor the quality of a received signal and can distribute the signal to nodes to perform an efficient search for a peripheral radio station.

In conclusion, alternative embodiments will now be described wherein the invention is applied:

(1) An apparatus for initiating a search for a radio station when during a wireless communication session a communication signal is so deteriorated that its strength is less than a predetermined reference.

(2) An apparatus for initiating a search for a radio station when during an ad hoc communication network session a communication signal is so deteriorated that its strength is less than a predetermined reference.

(3) An apparatus for initiating a search for a radio station when during a multi-hop wireless communication session a communication signal is so deteriorated that its strength is less than a predetermined reference.

(4) An apparatus for initiating a search for a radio station when during a wireless communication session the intensity of interference is increased until it is greater than a predetermined reference.

(5) An apparatus for initiating a search for a radio station when during an ad hoc communication network session the intensity of interference is increased until it is greater than a predetermined reference.

(6) An apparatus for initiating a search for a radio station when during a multi-hop wireless communication session the intensity of interference is increased until it is greater than a predetermined reference.

(7) An apparatus for increasing the frequency at which searches for radio stations are performed when during a wireless communication session a communication signal is so deteriorated that its strength is less than a predetermined reference.

(8) An apparatus for increasing the frequency at which searches for radio stations are performed when during an ad hoc communication network session a communication signal is so deteriorated that its strength is less than a predetermined reference.

(9) An apparatus for increasing the frequency at which searches for radio stations are performed when during a multi-hop wireless communication session a communication signal is so deteriorated that its strength is less than a predetermined reference.

(10) An apparatus for increasing the frequency at which monitoring for radio stations is performed when during a wireless communication session a communication signal is so deteriorated that its strength is less than a predetermined reference.

(11) An apparatus for increasing the frequency at which monitoring for radio stations is performed when during an ad hoc communication network session a communication signal is so deteriorated that its strength is less than a predetermined reference.

(12) An apparatus for increasing the frequency at which monitoring for radio stations is performed when during a multi-hop wireless communication session a communication signal is so deteriorated that its strength is less than a predetermined reference.

(13) An apparatus for increasing the frequency at which a searches for radio stations are performed when during a wireless communication session a communication signal is so deteriorated that its strength is less than a predetermined reference, and for reducing the frequency at which searches for radio stations are performed when the quality of a communication signal exceeds a predetermined reference.

(14) An apparatus for increasing the frequency at which a searches for radio stations are performed when during an ad hoc communication network session a communication signal is so deteriorated that its strength is less than a predetermined reference, and for reducing the frequency at which searches for radio stations are performed when the quality of a communication signal exceeds a predetermined reference.

(15) An apparatus for increasing the frequency at which a searches for stations are performed when during a multi-hop wireless communication session a communication signal is so deteriorated that its strength is less than a predetermined reference, and for reducing the frequency at which searches for radio stations are performed when the quality of a communication signal exceeds a predetermined reference

What is claimed is:

1. An apparatus in a node in a network, said node participating in a communication session for said node to initiate a search for a radio station during a communication session comprising:

signal monitoring component for detecting the strength of the communication signal; and comparator component for comparing the detected strength of the signal to a predetermined reference, for establishing that deterioration of signal strength is an index of topological change in the network, and for generating an initiation signal for said node to initiate a search by said node for a radio station when deterioration of the strength of the communication signal indicates the appearance of a new radio station.

2. The apparatus of claim 1 wherein the communication session is wireless.

3. The apparatus of claim 1 wherein the communication session is an ad hoc communication network session.

4. The apparatus of claim 1 wherein the communication session is a multi-hop wireless communication session.

5. An apparatus in a node in a network, said node participating in a communication session for initiating a search for a radio station by said node during a communication session comprising:

interference detection component for detecting the intensity of interference in the session; and comparator component for comparing the intensity of interference to a predetermined reference, for determining that a a change in the interference indicates a topological change in the network and for generating an initiation signal for said node to initiate said search when increased intensity of interference indicates the appearance of a new radio station.

6. The apparatus of claim 5 wherein the communication session is wireless.

7. The apparatus of claim 5 wherein the communication session is an ad hoc communication network session.

8. The apparatus of claim 5 wherein the communication session is a multi-hop wireless communication session.

9. An apparatus in a node in a network participating in a communication session for altering the frequency at which monitoring for radio stations is performed by said node during a communication session comprising:

signal monitoring component for detecting the strength of the communication signal; and comparator component for comparing the detected strength of the signal to a predetermined reference, for determining that a change in signal strength is due to a topological change in the network and for generating a signal to alter the frequency of said monitoring by said node when deterioration of the strength of the communication signal indicates the appearance of at least one new radio station.

10. The apparatus of claim 9 wherein the communication session is a wireless communication session.

11. The apparatus of claim 9 wherein the communication session is an ad hoc communication network session.

12. The apparatus of claim 9 wherein the communication session is a multi-hop wireless communication session.

13. A method performed by a node in a network, said node participating in a communication sessions, for initiating a search for a radio station by said node during a communication session comprising the steps of said node:

detecting the strength of the communication signal;

comparing the detected strength of the signal to a predetermined reference;

determining that a change in the strength of the communication signal indicates the appearance of a new radio station; and generating a initiation signal to initiate said search by said node when deterioration of the strength of the communication signal indicates the appearance of a new radio station.

14. A method performed by a node in a network participating in a communication session for initiating a search for a radio station by said node during a communication session comprising the steps of said node:

detecting the intensity of interference in the session;

comparing the intensity of interference to a predetermined reference;

determining that a change in interference is due to a topological change in the network; and generating an initiation signal to initiate said search by said node when increased intensity of interference indicates the appearance of a new radio station.

15. A method performed by a network node participating in a communication session for altering the frequency at which monitoring for radio stations is performed by said node during a communication session comprising the steps at said node of:

detecting the strength of the communication signal;

comparing the detected strength of the signal to a predetermined reference as an indication of a topological change in the network; and generating a signal to alter the frequency of said monitoring by said node when deterioration of the strength of the communication signal indicates the appearance of at least one new radio station.

16. The method of claim 15 wherein said altering comprising increasing frequency of monitoring to search for radio stations when the signal strength is less than a predetermined reference and decreasing the frequency when the signal strength exceeds the predetermined reference.

17. A program storage device readable by machine, tangibly embodying a program of instructions executable by the machine to perform method steps for initiating a search for a radio station in a network by a node during a communication session, said method comprising the steps for said node of:

detecting the strength of the communication signal;

comparing the detected strength of the signal to a predetermined reference as an indication of a change in topology of said network; and generating a initiation signal to initiate said search by said node when deterioration of the strength of the communication signal indicates the appearance of a new radio station.

18. A program storage device readable by machine, tangibly embodying a program of instructions executable by the machine to perform method steps for initiating a search for a radio station in a network by a node during a communication session, said method comprising the steps for said node of:

detecting the intensity of interference in the session;

comparing the intensity of interference to a predetermined reference a an indicator of a change in topology of the network; and generating an initiation signal to initiate said search by said node when increased intensity of interference indicates the appearance of a new radio station.

19. A program storage device readable by machine, tangibly embodying a program of instructions executable by the machine to perform method steps for altering the frequency at which monitoring for radio stations is performed in a network by a node during a communication session, said method comprising the steps for said node of:

detecting the strength of the communication signal;

comparing the detected strength of the signal to a predetermined reference as an indication of a topological change in the network; and generating a signal to alter the frequency of said monitoring by said node when deterioration of the strength of the communication signal indicates the appearance of at least one new radio station.

\* \* \* \* \*